April 8, 1952      E. J. GROTH, JR      2,592,416
INDICATING DEVICE FOR RADIOACTIVITY INTENSITY
Filed Sept. 26, 1947
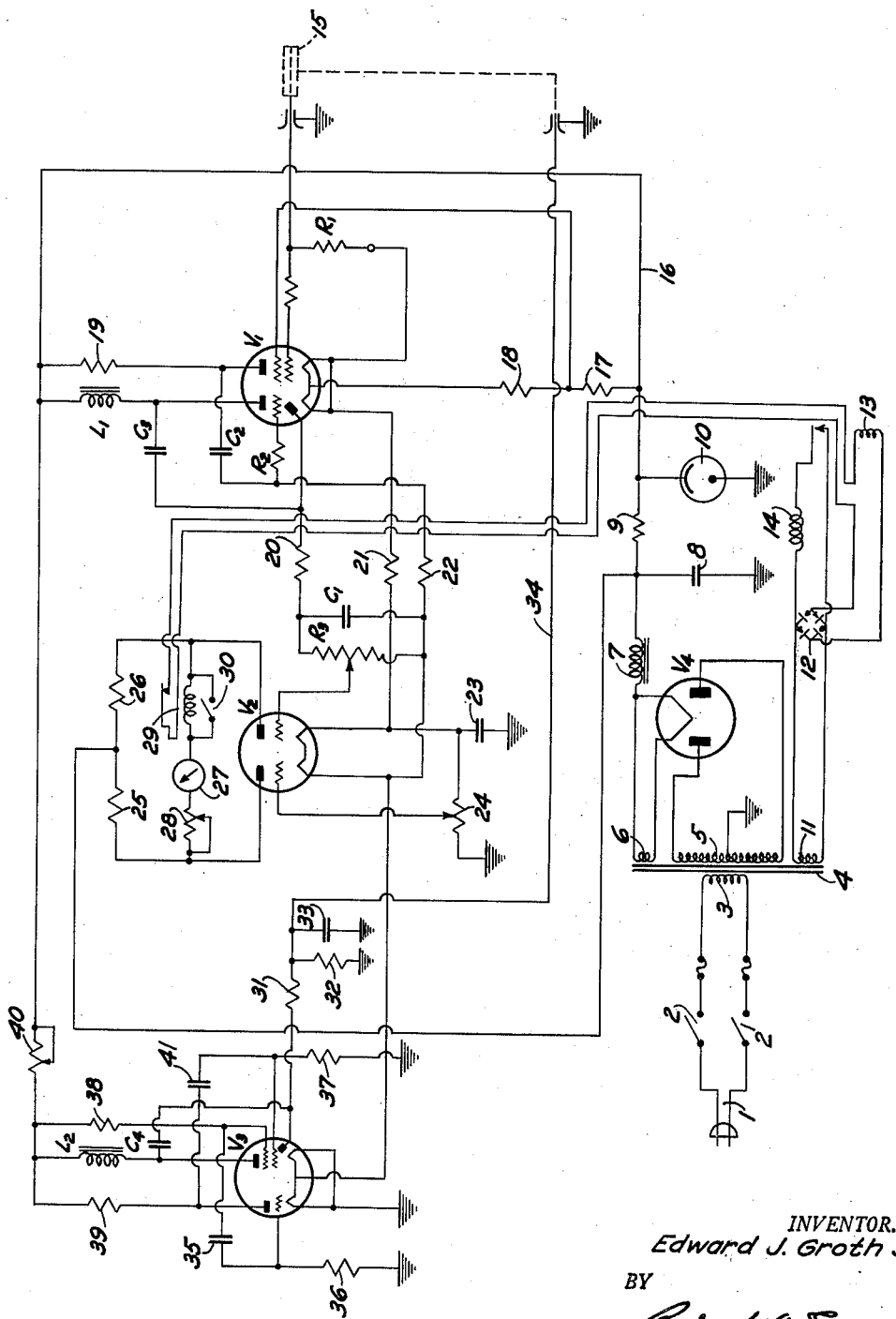
INVENTOR.
Edward J. Groth Jr.
BY Patented Apr. 8, 1952

2,592,416

UNITED STATES PATENT OFFICE 2,592,416

INDICATING DEVICE FOR RADIOACTIVITY INTENSITY

Edward J. Groth, Jr., St. Louis, Mo., assignor, by mesne assignments, to the United States of America as represented by the United States Atomic Energy Commission Application September 26, 1947, Serial No. 776,245

8 Claims. (Cl. 250—83.6)

My invention relates to counters and more particularly to counting rate meter circuits to provide indications proportional to the pulse rate.

In the detection of radiations from radioactive substances, or otherwise, pulse counting procedures are often used, and for this purpose the Geiger-Mueller counters are very useful instruments. Since such counters are capable of producing pulses at a very high numerical rate, and since it is desirable to operate them at such speeds, a method of recording the pulses is needed. The counting rate meter gives a direct reading that is proportional to the number of pulses per minute that is introduced at the meter input. It is particularly useful in obtaining a continuous record of the intensity of a pile.

In the circuits of the prior art, pulses of different magnitude from the Geiger-Mueller tube are amplified and delivered to the indicator as pulses of non-uniform character. This tends to give a false indication of the pulse rate and contributes to inaccuracies which effect the reliability of the system as a counter, since the system is not sensitive solely to the number of pulses arriving at any given time, due to the non-uniformity of the pulses.

Applicant with a knowledge of all of these defects in and objections to the counters and counter circuits of the prior art has for an object of his invention the provision of a counting rate meter circuit which will deliver pulses of uniform magnitude to the indicator for producing uniform indications.

Applicant has as another object of his invention the provision of a counting rate meter circuit having an impedance load including a choke to provide a back E. M. F. substantially independent of input pulse size and to furnish an indication proportional to the pulse rate.

Applicant has an another object of his invention the provision of a counting rate meter circuit which is sensitive only to the number of pulses arriving in any given period of time by causing all of the pulses to assume substantially the same shape and size.

Other objects and advantages of my invention will appear from the following specification and the accompanying drawing and the novel feature thereof will be particularly pointed out in the annexed claims.

In the drawing the sole figure is a schematic of the circuit of my improved rate counter.

The system comprises a conventional main power supply, multivibrator voltage supply for a Geiger-Mueller tube, a pulse amplifying and shaping circuit, a pulse rectifier, and a conventional push-pull vacuum tube volt meter circuit.

Referring to the drawing in detail, 1 designates the leads for the conventional power supply which pass through switches 2, 2 from the power line to the primary winding 3 of a power transformer 4. The transformer 4 has a secondary winding 5 with a grounded center tap. The two outer terminals of winding 5 are connected to the plates of a full wave rectifier $V_4$. The transformer 4 also has a supplemental winding 6 which feeds the cathode of tube $V_4$ or its heater element. The cathode of rectifier $V_4$ feeds into a filter for taking out the ripple and includes inductance 7 and capacitance 8 as well as resistance 9 and voltage regulator tube 10. Voltage regulator tube 10 and condenser 8 are grounded to complete the circuit through the grounded center tap of transformer winding 5. Resistance 9 and tube 10 feed into the power lead 16 for the multivibrator $V_3$, amplifier $V_1$ and volt meter tube $V_2$.

An additional supplemental winding 11 is provided on transformer 4 to feed a rectifier 12. This in turn controls the energization of the winding of relay 13 for closing a circuit through buzzer 14, as described hereinafter.

The conventional Geiger-Mueller tube 15 has a center electrode feeding into the control grid of the tetrode of diode-triode-tetrode tube $V_1$. Connected across the grid cathode circuit of the tetrode is a leak resistor $R_1$. The screen grid of the tetrode is fed from the power lead 16 through a load resistor 17. The cathodes of tube $V_1$ are tied together and their juncture is connected through cathode resistor 18 to the load resistor 17.

The plate of tetrode section of tube $V_1$ is connected to the power source through load resistor 19 and is also coupled to the control grid of the triode section through condenser $C_2$ and resistance $R_2$. Resistance $R_2$ prevents the triode grid from drawing appreciable current, thus preventing the charging up of condenser $C_2$ and the blocking of the amplifier. The same cathode of tube $V_1$ serves both the triode and diode rectifier. The plate of the triode is coupled to the plate of the diode by condenser $C_3$. The plate of the triode of tube $V_1$ is also connected to the B+ power supply through the inductance $L_1$. The charge drawn upon the diode of tube $V_1$ by the back-kick of the inductance $L_1$ is conducted off through resistor 20 and potentiometer $R_3$. The potentiometer $R_3$ is bridged by condenser $C_1$, and the moving contact thereof is joined to the control grid of the first triode of duo-triode tube $V_2$. The cathode of the triode of tube $V_1$ is coupled to one lead of the first cathode of the series connected cathodes of tube $V_2$ through resistance 21 and also is connected to ground through condenser 23 and voltage divider 24 in parallel. The other cathode lead of tube $V_2$ is then connected to the juncture of the cathodes of tube $V_3$. The moving contact on voltage divider 24 is joined to the grid of the second triode of tube $V_2$ to provide an adjustable bias for that tube. The plates of tube $V_2$ are joined to the plate supply through resistors 25, 26 and bridging the plates of these two tubes is a volt meter 27 and an adjustable resistance 28, connected in series. Also interposed in this circuit may be the winding of a relay 29 which may act to control a buzzer element to be referred to hereinafter. A manually operated switch 30 may also bridge the winding of the relay 29 to insert it or remove it from the circuit by the opening and closing of the switch.

A multivibrator may be employed to furnish power to the G–M tube 15. The multivibrator may include a tube $V_3$ with a tetrode and a triode in it. The cathode of the tetrode may also serve as a part of a diode rectifier tube. The plate of the rectifier of tube $V_3$ is coupled to the shell or outer electrode of the G–M tube 15 through a filter including resistances 31, 32 and condenser 33. The condenser 33 and resistance 32 are connected across the diode of tube $V_3$ since they are in parallel from lead 34 to ground. The control grid of the tetrode section of tube $V_3$ is coupled to the plate of the triode section of that tube through condenser 41 and the control grid of the triode section of the tube $V_3$ is coupled to the screen grid of the tetrode section of that tube through condenser 35. The control grids of the triode and tetrode sections of tube $V_3$ are grounded through leak resistors 36, 37. The cathodes of tube $V_3$ are joined together and grounded and their juncture is connected to the cathodes of tube $V_2$. The screen grid of the tetrode section is fed from the power supply through load resistor 38 and the plates of the tetrode and diode sections of tube $V_3$ are coupled together through condenser $C_4$. The B+ power supply is coupled to the plate of triode section of tube $V_3$ through a load resistor 39 and in the plate circuit of the tetrode section of tube $V_3$ is an inductance $L_2$. The adjustable resistance 40 serves to control the voltage on the plates and screen grids of the triode and tetrode sections of tube $V_3$.

The heating current for the cathodes of tubes $V_1$, $V_2$ and $V_3$ is derived from the B+ power lead 16 and may be traced through resistances 17, 18, cathodes of $V_1$, resistance 21, cathodes of $V_2$ to ground through voltage divider 24, and from cathodes of tube $V_2$ to cathodes of tube $V_3$ to ground. Since the winding 5 of transformer 4 is grounded at a center top, this will complete a circuit through the heater elements of the above tubes.

As indicated the voltage source for the G–M tube 15 is a multivibrator oscillator and rectifier combined into one tube $V_3$. The triode and tetrode sections are connected as described in a conventional oscillator circuit, except that the plate load on the tetrode section is a large choke used to build up high voltage pulses on the plate of said section. These pulses are coupled to the diode plate through a condenser $C_4$, where they are rectified and the resulting voltage is smoothed by an R. C. filter 31, 32 and 33, before being applied to the G–M tube. This circuit provides a compact, light-weight, and inexpensive power supply.

The negative side of said supply is connected to the case of the G–M tube, and the positive side is grounded. A resistor, $R_1$, is connected between the center element of the G–M tube and the filament of $V_1$, which is grounded through the other tube filaments. When a beta particle enters the G–M tube, a current is caused to flow through the tube producing a voltage drop across $R_1$ and a negative pulse on the control grid in the tetrode section of $V_1$. In order that the instrument be sensitive only to the number of pulses arriving in any given period of time, all pulses are made to assume the same shape and size without regard to their original shape and size. This is accomplished in the following circuit: The tetrode section of $V_1$ operates at zero bias. The pulse is amplified and appears as a positive pulse on the plate. A small amount of clipping action takes place here on signals sufficiently large to drive the grid beyond cut-off. This positive pulse is fed through a blocking condenser, $C_2$, to the grid of the triode section of $V_1$ where more pulse shaping takes place. The triode section operates at about one and one-half times cut-off bias. Positive signals drive the grid only as far as zero, however, because of the voltage drop across $R_2$ due to grid current. This action causes all pulses on the grid to be of uniform height. Large uniform height negative pulses appear on the plate of this triode, which has a choke, $L_1$, as its load impedance. Each pulse charges the inductance to a constant value. When the pulse voltage at the triode grid of tube $V_1$ returns to zero, the energy stored in the inductance $L_1$ is returned to the diode section in the form of a positive voltage pulse. This positive signal produces conduction in the diode, causing the condenser $C_1$ to receive an increment of charge. If the resonant period of the inductance $L_1$, in shunt with the various capacities to ground present at the junction of inductance $L_1$ with the plate of the triode section of $V_1$, is long compared to the time it takes the grid voltage at the triode to fall from the zero bias value to cut-off, the amplitude of the positive voltage pulse formed at the inductance output terminal will be nearly independent of the pulse duration from the Geiger Müller tube 15. The saturation effects of the triode make this pulse voltage also independent of the Geiger Müller tube pulse amplitude over wide limits. This is particularly true if the L. C. combination just described is critically damped to prevent multiple oscillations. The damping can be accomplished by using an inductance with high internal losses or by the well known expedient of shunting a resistance of the proper value across the inductance. The diode plate is biased to about 4.5 volts thus eliminating all signal and possible stray hash while at the same time allowing the large back E. M. F. pulses to be rectified. These rectified pulses charge a one microfarad condenser, $C_1$, whose charge is allowed to leak off through a ten megohm resistance, $R_3$, across $C_1$. The value of either $R_3$ or $C_1$ may be changed to adjust the time constant of the instrument to a desired value.

If wanted, a relay 29 can be connected in series with the meter 27 in the vacuum tube voltmeter circuit to sound an alarm or furnish control for auxiliary equipment when the pulse rate exceeds a given value. The closing of relay 29 completes the circuit from rectifier 12 through relay winding 13 to energize it and complete the circuit through the supplementary winding 11 to the buzzer 14 for giving a signal.

Having thus described my invention, I claim:

1. A counting rate circuit of the character described comprising a counter, a source of power for said counter, amplifying means fed by said counter, said amplifying means serving to clip pulses greater than those of a predetermined magnitude inductive wave shaping means in the output of the amplifier to provide waves of similar shape, means for rectifying the output of said wave shaping means, an integrating circuit in series with said rectifying means, and a vacuum tube volt meter for indicating the pulse rate.

2. A counting rate circuit of the character described comprising a counter, a multivibrator power source for said counter, amplifying means fed by said counter, said amplifying means serving to clip pulses fed thereto, wave shaping means in the output circuit of said amplifying means to provide pulses of similar configuration, integrating means fed by said amplifying means, and means for indicating the pulse rate.

3. A counting rate circuit of the character described comprising a counter, a multivibrator, a rectifier fed by the multivibrator, filter means for coupling the rectifier to the counter to provide a power source therefor, amplifiers in cascade fed by said counter, said amplifiers serving to clip pulses above a predetermined magnitude, wave shaping means in the output circuit of the amplifying means to produce pulses of similar form, a rectifier coupled to the output circuit of the amplifying means, and means fed by said rectifier for indicating the pulse rate.

4. A rate counting circuit of the character described comprising a counter, a power source for said counter, an unbiased amplifier coupled to said counter, a second amplifier connected in cascade with said first amplifier and biased at least to cut off, said amplifiers serving to clip pulses above a predetermined magnitude and to shape them into pulses of substantially uniform magnitude, inductive means in the output of said second amplifier for acting on the pulses to peak them, rectifier means coupled to said inductive means at the output of said second amplifier, said rectifier means feeding a pulse rate indicator for indicating the pulse rate of said pulses.

5. A counting rate meter circuit of the character described comprising a counter, a source of power for the counter, an amplifier fed by the counter for producing pulses in its output circuit, pulse forming means in the output circuit of said amplifier for producing pulses of substantially uniform size, an integrating circuit coupled to the output circuit of said amplifier, and means fed by the integrating circuit for indicating the pulse rate.

6. A counting rate meter circuit of the character described comprising a radiation detector, amplifying means fed by the detector, pulse shaping and forming means in the output circuit of the amplifier, a rectifier coupled to the output circuit of the amplifier, an integrating circuit fed from the output circuit of said amplifier through said rectifier, and means coupled to the integrating circuit for indicating the pulse rate.

7. A counting rate meter circuit of the character described comprising a radiation detector, amplifying means fed by the detector, inductive means in the output circuit of said amplifying means for forming and shaping pulses, a diode coupled to the output circuit of said amplifier for receiving the pulses from said inductive means, an integrating circuit connected to the inductive means and fed through said diode, and means for indicating the pulse rate determined by said integrating circuit.

8. A counting rate circuit of the character described comprising a counter, a multivibrator power source for said counter, inductive means for peaking the voltage output of said multivibrator, amplifying means fed by said counter, said amplifying means serving to clip pulses greater than those of a predetermined magnitude, inductive wave shaping means fed by the amplifying means to provide waves of similar magnitude, means for rectifying the output of said wave shaping means, an integrating circuit coupled to the rectifying means, and a vacuum tube voltmeter for indicating the pulse rate.

EDWARD J. GROTH, JR.

REFERENCES CITED

The following references are of record in the file of this patent:

UNITED STATES PATENTS

| Number | Name | Date |
|---|---|---|
| 2,434,297 | Test et al. | Jan. 13, 1948 |
| 2,462,140 | Spicer | Feb. 22, 1949 |

OTHER REFERENCES

Huntoon, Review of Scientific Instruments, vol. 10, June 1939, pp. 176–178.

Strong, Procedure in Experimental Physics, Prentice Hall, Inc. N. Y., 1938, pp. 283–286.

Korff-Electron and Nuclear Counters, D. Van Nostrand, Inc. Apr. 1946, pp. 183–185 and 193.

Bousquet, Electronic Industries, Sept. 1946, pp. 88, 189.